May 23, 1933. L. G. WHEAT 1,910,729
PISTON RING APPLIER
Filed May 13, 1932
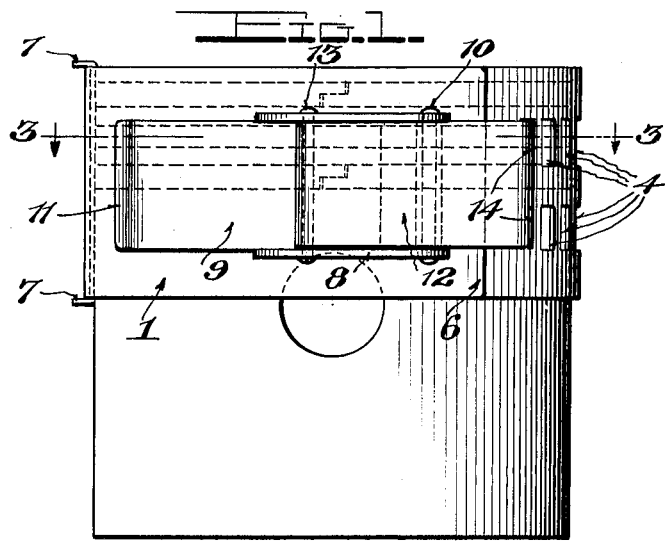
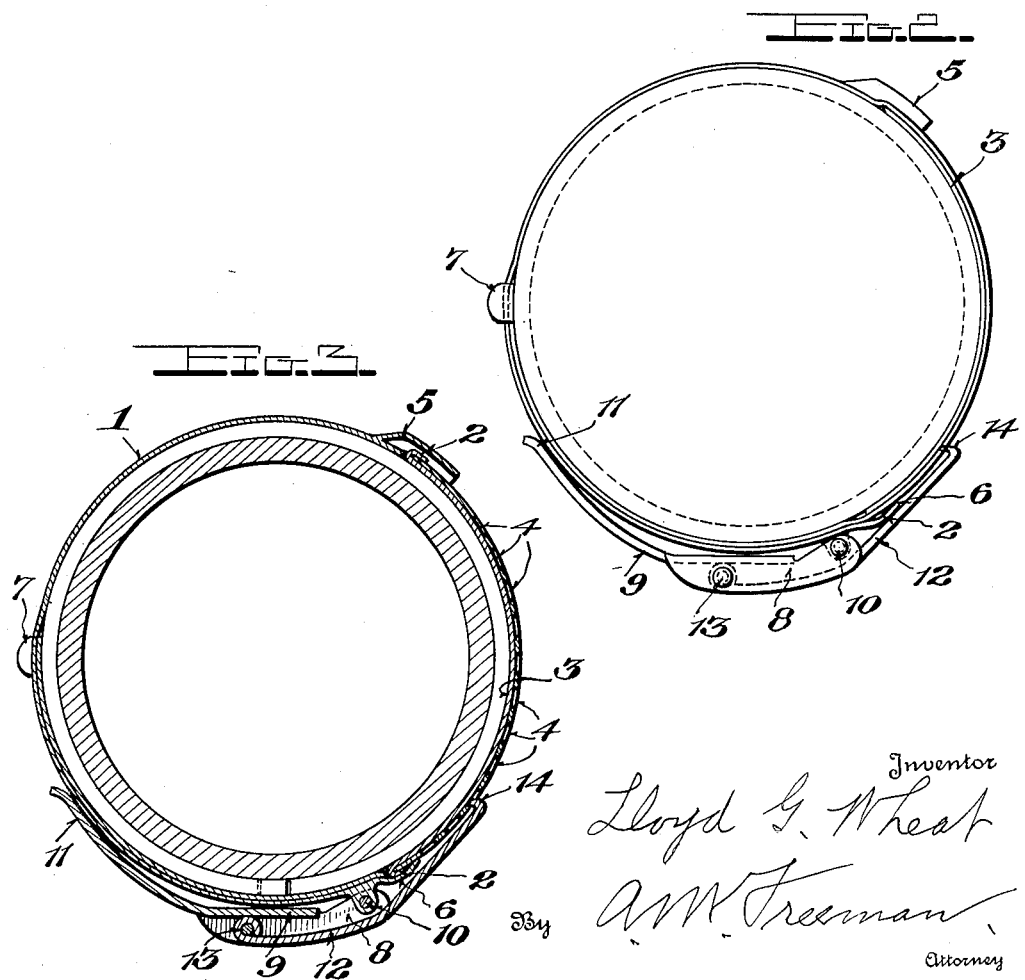
Inventor
Lloyd G. Wheat
By A. W. Freeman
Attorney Patented May 23, 1933

1,910,729

UNITED STATES PATENT OFFICE

LLOYD G. WHEAT, OF MONTROSE, SOUTH DAKOTA

PISTON RING APPLIER

Application filed May 13, 1932. Serial No. 611,190.

This invention relates to piston ring appliers and the primary object of the invention is to provide an improved device of this type which has a complete smooth inner circumference thereby to more effectively hold the rings contracted and in their grooves.

The invention further aims to provide a more simplified and economical device which is efficient in operation and which may be easily and quickly manipulated.

In the drawing:

Fig. 1 is a side elevation of the invention applied to a piston;

Fig. 2 is a top plan view; and

Fig. 3 is a section on line 3—3 of Fig. 1.

In proceeding in accordance with the present invention, a split ring 1 is employed, the ends of which overlap. The ring is formed with spaced slots through which engage hooks 2 on the ends of a curved band 3 that is disposed on the inner circumference of the ring 1. The ring and band 3 are formed of yieldable material and the ring is formed with two series of openings 4 which overlie the band and which provide rack teeth. The member 5 is secured to the ring 1 and extends over one of the hooks 2 so as to protect the latter while a corresponding member 6 extends over the other hook 2 likewise to protect same. One end of the ring is formed with lateral ears 7 which engage over the other end of the ring so as to hold the ends of the ring against relative transverse movement. One end of the ring is further formed with lateral wings 8 between which one end of a lever 9 is pivoted by means of a pin 10, the lever having a free end 11 which affords a handle. A member 12 is pivoted by means of a pin 13 between the wings 8 and has a pair of hooks 14 formed on its free end for engagement with selected ones of the openings of the two series 4. By virtue of the fact that the band 3 is disposed interiorly of the ring 1 it will be apparent that the inner circumference of the latter is maintained smooth due to the fact that the band extends over the rack teeth and thus affords a more effective securement of the piston rings within their grooves. Moreover, by constructing the ring 1 and the band 3 of yieldable material it will be seen that the hooks 14 upon movement of the lever 9 to position the parts in piston ring holding position, engage between the band and the ring and thus have a firm anchorage the hooks thus being prevented from engaging the piston rings due to the presence of the band. In addition, it will be observed that due to the smooth inner circumference of the ring, the latter more snugly fits around the piston and its rings and that as the piston is forced into the cylinder, the device more readily slides thereon, and when the piston has been entirely positioned the device may be easily removed by manipulation of the lever 11.

What is claimed, is:

1. In a piston ring applier, a split ring formed with two series of spaced openings, the ends of which overlap and one of which ends has lateral ears on its sides engageable with the sides of the other end to hold the ends against transverse movement, a yieldable curved band disposed within the ring interior and extending over the openings thereof, said ring having spaced slots and the band having hook-like parts engaged through the slots to fixedly connect the band to the ring, a lever pivoted to the band adjacent the opposite end thereof, and a member pivoted to the lever between the ends of the latter and having a pair of hooks on its free ends to engage through selected ones of the two series of the band openings, and to lie between the band and the inner circumference of the ring.

2. In a piston ring applier, a split ring formed with two series of spaced openings and the ends of which overlap, a curved yieldable band disposed interiorly of and adjacent one end of the ring and disposed over said openings, means to secure the ends of the band to the ring, a lever pivoted to the ring adjacent its opposite end, and a member pivoted to the lever and having a free end formed with hooks to engage through selected ones of the two series of openings of the band and between the band and ring.

3. In a piston ring applier, a split ring formed with a series of spaced openings and the ends of which ring overlap, a curved yieldable band disposed interiorly of the ring and extending over said openings, means to secure the band to the ring, a lever pivoted to the ring adjacent one end of the latter, and a member pivoted to the lever and having a hook to engage in a selected one of the openings and between the band and ring.

4. In a piston ring applier, a split ring having a series of openings and the ends of which ring overlap, a member connected to the interior of the ring and extending over the openings so as to provide a smooth inner circumference for the ring, and means to contract the ring connected to the opposite end thereof and having means to engage in the openings of the ring.

In testimony whereof I affix my signature.

LLOYD G. WHEAT.